United States Patent
Lanfranchi

(10) Patent No.: US 6,568,882 B2
(45) Date of Patent: May 27, 2003

(54) APPARATUS FOR CONVEYING CONTAINERS SUSPENDED BY PROTRUDING NECK RINGS

(76) Inventor: Lino Lanfranchi, via Caduti del Lavoro, 35 43044 Collecchio (Parma) (IT)

(*) Notice: Subject to any disclaimer, the term of this patent is extended or adjusted under 35 U.S.C. 154(b) by 0 days.

(21) Appl. No.: 09/732,987

(22) Filed: Dec. 8, 2000

(65) Prior Publication Data

US 2001/0006592 A1 Jul. 5, 2001

(30) Foreign Application Priority Data

Dec. 23, 1999 (IT) .................................... PR99A000096

(51) Int. Cl.[7] ............................................. B65G 53/16
(52) U.S. Cl. ......................... 406/86; 406/88; 198/454; 198/460.1
(58) Field of Search ................. 406/86, 88; 198/454, 198/460.1

(56) References Cited

U.S. PATENT DOCUMENTS

| 5,170,879 A | * | 12/1992 | Smith ......................... 198/452 |
| 5,421,678 A | | 6/1995 | Aidlin et al. |
| 5,542,789 A | | 8/1996 | Aidlin et al. |
| 5,628,588 A | * | 5/1997 | Ouellette ..................... 406/88 |
| 5,768,860 A | * | 6/1998 | Weaver ....................... 198/444 |
| 5,810,516 A | | 9/1998 | Ouellette |
| 6,318,935 B1 | * | 11/2001 | Ouellette .................. 406/86 X |

FOREIGN PATENT DOCUMENTS

FR            2 767 517 A        2/1999

* cited by examiner

Primary Examiner—Christopher P. Ellis
Assistant Examiner—Richard Ridley
(74) Attorney, Agent, or Firm—Michael Best & Friedrich LLC

(57) ABSTRACT

The invention relates to the field of conveyors for containers of plastic, for example PET, with protruding neck rings. In particular, the apparatus (1) comprises a supporting structure (4) that mounts a track (5) which supports the containers by their neck rings (3). The apparatus further comprises means for propelling the containers along the feed path and means for detecting jammed containers along the feed path. At least one pusher (7) is mounted on the supporting structure (4) to act on the containers when a jam is detected.

6 Claims, 2 Drawing Sheets

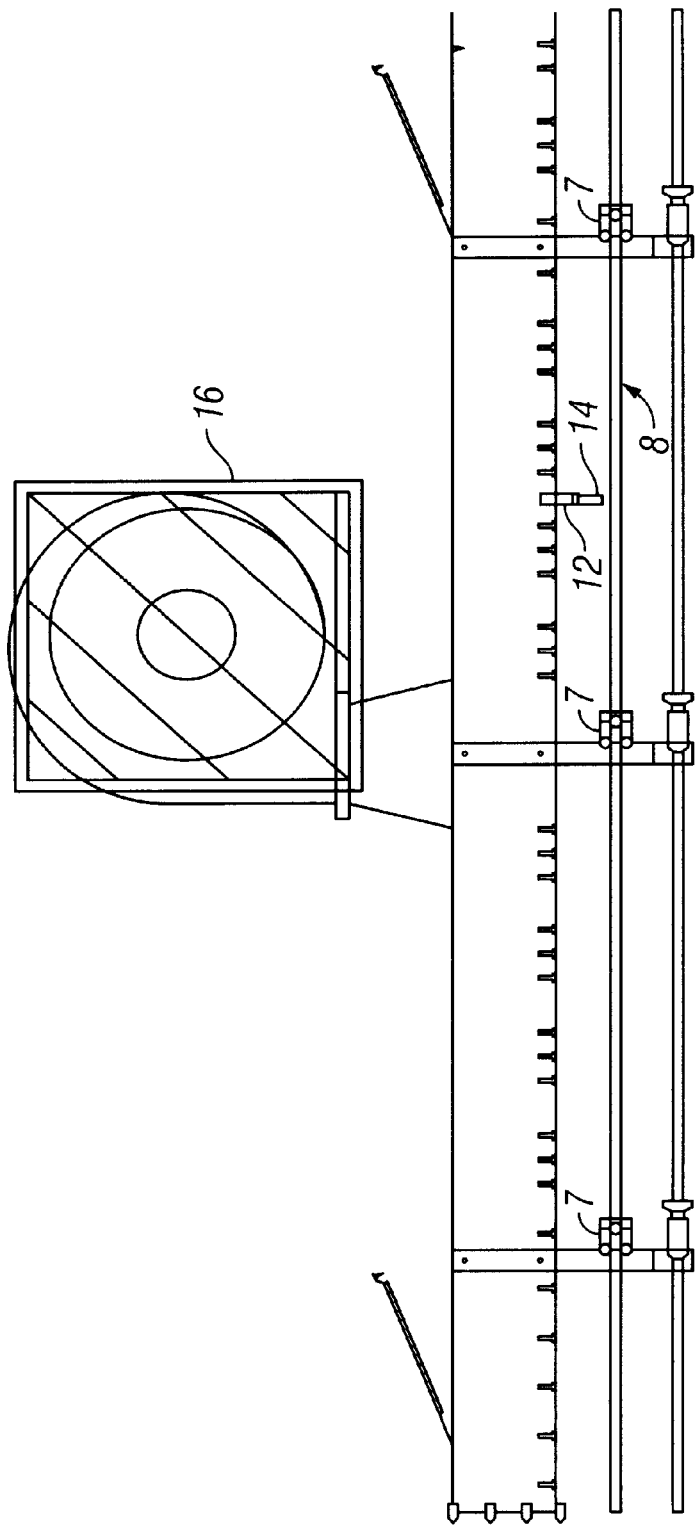

APPARATUS FOR CONVEYING CONTAINERS SUSPENDED BY PROTRUDING NECK RINGS

BACKGROUND OF THE INVENTION

The present invention relates to an apparatus for conveying containers, such as PET bottles, suspended by protruding neck rings.

As is known, containers with protruding neck rings can be conveyed using air conveyors in which the container is supported under the neck ring within a track and is propelled by air jets produced by fans located along the container feed path.

Air conveying apparatus normally comprises a supporting frame on which the track that supports the container by its neck ring is mounted.

There may also be guides running parallel to the feed path designed to keep the body of the container vertical.

Air conveying apparatus of this known type has an important disadvantage. Indeed, in the Applicant's experience in the sector, jams frequently occur along the feed path, especially if long-necked bottles are being handled.

SUMMARY OF THE INVENTION

The aim of the present invention is to overcome the above mentioned disadvantage by providing an apparatus for conveying suspended containers with protruding neck rings and which is capable of detecting and eliminating jams along the container feed path. This aim is fully achieved by the apparatus for conveying containers suspended by their protruding neck rings made according to the present invention as characterised in the claims below and in particular characterised in that it comprises means for detecting jammed containers along the feed path and at least one pusher mounted on a supporting structure and designed to act on the containers when a jam is detected.

BRIEF DESCRIPTION OF THE DRAWINGS

These and other characteristics are described in more detail below with reference to the accompanying drawing which illustrates a preferred embodiment of the invention and in which

FIG. 2 is a side elevational view of the apparatus depicted in FIG. 1.

DESCRIPTION OF THE PREFERRED EMBODIMENTS

Figure 1:
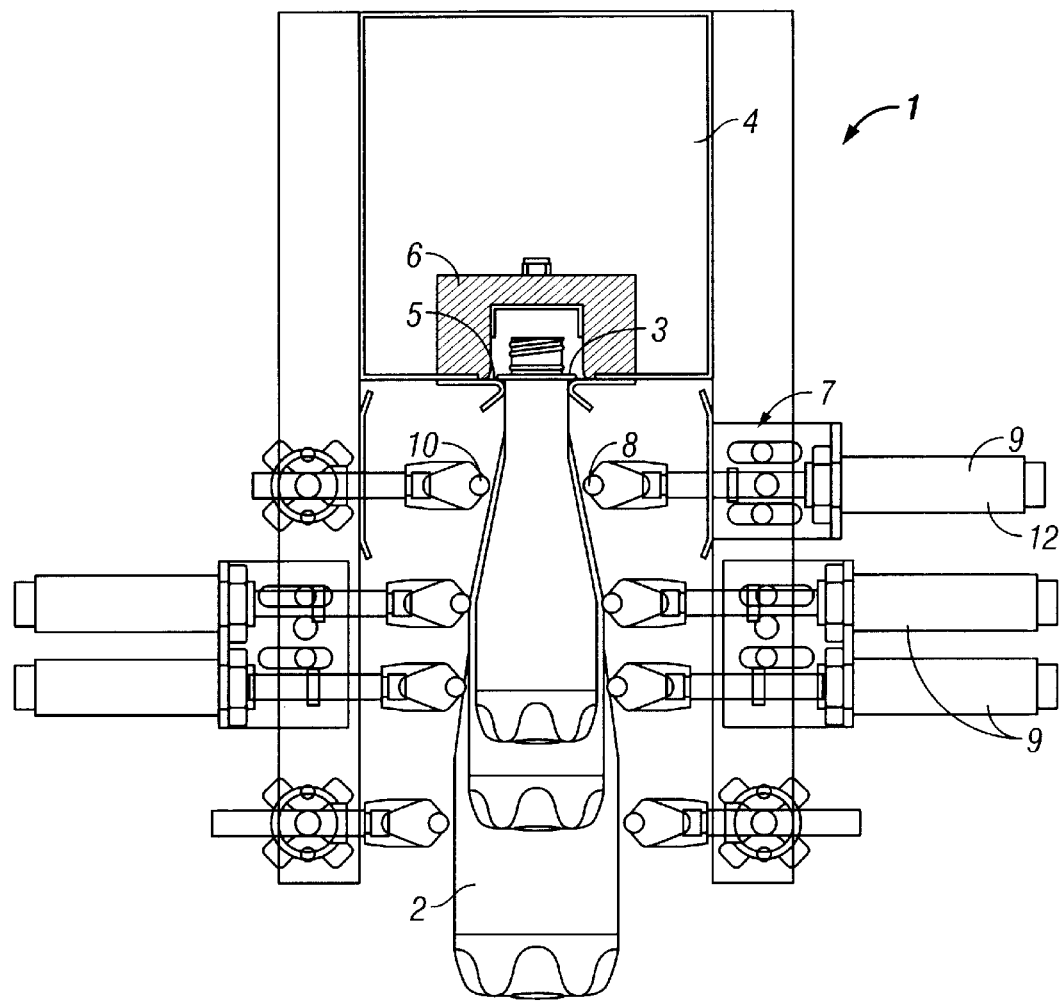
FIG. 1 is a front cross-sectional view of the apparatus for conveying suspended containers made according to the present invention.

With reference to FIG. 1, the numeral 1 indicates an apparatus for conveying containers 2, in particular PET bottles, suspended by a neck ring 3.

The apparatus 1 comprises a supporting structure 4 consisting of a frame extending all along the feed path of the containers.

The supporting structure 4 mounts a track 5 that interacts with the neck ring 3 of the containers to define the feed path. The track 5 is made from a press bent sheet that forms a groove into which the neck of the container fits. Over the track 5, there is a covering element 6 in the shape of an upturned "U".

The apparatus 1 further comprises means for propelling 16 the containers along the feed path. These means are connected to the supporting structure 4 and, being in the form of pneumatic means, consist of a plurality of fans distributed along the feed path and varying in number according to the power of each individual fan, that is to say, the propelling force that each individual fan can apply to the containers. The novel aspect of the air conveyor according to the present invention is that it comprises means for detecting 12 containers that have jammed along the feed path and at least one pusher 7 mounted on the supporting structure 4 and designed to act on the containers when jam is detected.

Looking in more detail, with reference to the embodiment illustrated in the drawing, the pusher 7 comprises a guide 8 running parallel to the container feed path and mounted on the supporting structure 4, below the track 5. The guide can move in a direction transversal to the container feed path and, for this purpose, comprises an actuator 9 consisting of a cylinder whose lining is attached to the supporting structure 4 and whose stem is attached to the mobile guard 8. The actuator 9 is triggered by the means for detecting 12 the jammed containers and causes the guide 8 to move transversally relative to the feed path of the containers 2 until the guide comes into contact with the containers in such a way as to clear the jam.

The apparatus 1 further comprises a fixed guide 10 located on the opposite side of the container feed path. The fixed guide and the mobile guide lie preferably in the same plane, close to the neck of the container, below the neck ring 3. The means for detecting 12 jammed containers are illustrated in FIG. 2 and may comprise two or more photocells 14 mounted on the supporting structure along the container feed path. The preferred embodiment illustrated also comprises other guides which act on the body of the container. The apparatus according to the present invention works in the following manner.

The photocells 14 mounted along the container feed path detect any break in the flow of containers caused by jam along the feed path. The photocells 14 then send a control signal to the actuator 9 which moves the mobile guide 8 sideways relative to the feed path. The mobile guide shuffles the row of containers until the jam is cleared. The actuator 5 operates on the mobile guide 8 repeatedly and alternately, applying a series of rhythmic strokes on the row of containers. The action of the actuator 5 continues until the photocells 14 detect an uninterrupted flow of containers again. The apparatus 1 according to the present invention has several important advantages. In particular, it facilitates smooth, uninterrupted flowing of the containers, including those with elongated shapes, such as certain types of PET bottles, which tend to jam very easily. Moreover, it is simple in construction and operation, and does not encumber the container handling system.

What is claimed:

1. An apparatus (1) for conveying containers (2) including necks and neck rings, the containers being suspended by their neck rings (3), the apparatus being of the type comprising:

a supporting structure (4);

a track (5) mounted on the supporting structure for supporting containers by their neck rings, the groove extending along the track to form a feed path and the track including a groove having a width larger than the diameter of the necks and smaller than the diameter of the neck rings;

means for propelling the containers along the feed path connected to the supporting structure;

means for detecting jammed containers along the feed path; and at least one pusher (7) mounted on the supporting structure for repeatedly striking the containers when a jam is detected.

2. The apparatus according to claim 1, wherein the pusher (7) has at least one mobile guide (8) mounted on the supporting structure below the track and extending substantially parallel to the container feed path.

3. The apparatus according to claim 2, wherein the mobile guide (8) has an actuator (9) causing the guide to move repeatedly to and from the container feed path for repeatedly striking the containers.

4. The apparatus according to claim 2, a fixed guide (10) is located opposite the mobile guide (8) on the other side of the container feed path.

5. The apparatus according to claim 1, wherein the means for detecting jammed containers have at least one photocell mounted on the supporting structure (4) along the container feed path.

6. The apparatus according to claim 1, wherein the means for propelling the containers along the feed path are pneumatic means.

* * * * *